(12) United States Patent
Endo et al.

(10) Patent No.: US 11,201,334 B2
(45) Date of Patent: Dec. 14, 2021

(54) NONAQUEOUS ELECTROLYTE SECONDARY BATTERY POSITIVE ELECTRODE AND NONAQUEOUS ELECTROLYTE SECONDARY BATTERY

(71) Applicant: Panasonic Intellectual Property Management Co., Ltd., Osaka (JP)

(72) Inventors: Kazuki Endo, Hyogo (JP); Tomoki Shiozaki, Osaka (JP); Yuji Oura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 47 days.

(21) Appl. No.: 16/568,826

(22) Filed: Sep. 12, 2019

(65) Prior Publication Data
US 2020/0006778 A1    Jan. 2, 2020

Related U.S. Application Data

(63) Continuation of application No. PCT/JP2018/004361, filed on Feb. 8, 2018.

(30) Foreign Application Priority Data

Mar. 16, 2017    (JP) .............................. JP2017-050984

(51) Int. Cl.
*H01M 4/66*        (2006.01)
*H01M 4/131*       (2010.01)
*H01M 4/62*        (2006.01)
*H01M 4/485*       (2010.01)
(Continued)

(52) U.S. Cl.
CPC ........... *H01M 4/667* (2013.01); *H01M 4/131* (2013.01); *H01M 4/485* (2013.01); *H01M 4/622* (2013.01);
(Continued)

(58) Field of Classification Search
CPC ........... H01M 10/052; H01M 10/0525; H01M 10/0585; H01M 2004/028; H01M 4/131;
(Continued)

(56) References Cited

U.S. PATENT DOCUMENTS

2007/0048613 A1    3/2007    Yanagida et al.
2011/0159361 A1    6/2011    Minami et al.
(Continued)

FOREIGN PATENT DOCUMENTS

CN    105742573 A    7/2016
CN    105932221 A    9/2016
(Continued)

OTHER PUBLICATIONS

International Search Report dated Mar. 13, 2018, issued in counterpart application No. PCT/JP2018/004361, with English translation. (4 pages).

(Continued)

*Primary Examiner* — Lingwen R Zeng
(74) *Attorney, Agent, or Firm* — Westerman, Hattori, Daniels & Adrian, LLP

(57) ABSTRACT

A positive electrode is provided with: a positive electrode current collector constituted of aluminum as the main component; a positive electrode mixture layer formed on the positive electrode current collector aid containing a lithium-containing transition metal oxide; and a protective layer interposed between the positive electrode current collector and the positive electrode mixture layer. The protective layer contains inorganic particles, a conductive agent, and a binder material. In the positive electrode, the peel strength between the positive electrode current collector and the protective layer is higher than the peel strength between the protective layer and the positive electrode mixture layer.

9 Claims, 4 Drawing Sheets

(51) Int. Cl.
  *H01M 10/0525* (2010.01)
  *H01M 4/02* (2006.01)
  *H01M 10/052* (2010.01)
  *H01M 10/0585* (2010.01)

(52) U.S. Cl.
  CPC ....... *H01M 4/661* (2013.01); *H01M 10/0525* (2013.01); *H01M 4/628* (2013.01); *H01M 4/668* (2013.01); *H01M 10/052* (2013.01); *H01M 10/0585* (2013.01); *H01M 2004/028* (2013.01); *Y02E 60/10* (2013.01)

(58) Field of Classification Search
  CPC ...... H01M 4/485; H01M 4/622; H01M 4/628; H01M 4/661; H01M 4/667; H01M 4/668; Y02E 60/10
  See application file for complete search history.

(56) References Cited

U.S. PATENT DOCUMENTS

| | | | |
|---|---|---|---|
| 2013/0224587 A1 | 8/2013 | Uemura | |
| 2016/0190566 A1* | 6/2016 | Shiozaki | H01M 4/366 429/231.1 |
| 2016/0254545 A1 | 9/2016 | Sugita et al. | |
| 2017/0125791 A1* | 5/2017 | Fukunaga | H01M 10/0525 |
| 2017/0187036 A1* | 6/2017 | Endo | H01M 10/0525 |

FOREIGN PATENT DOCUMENTS

| | | |
|---|---|---|
| JP | S62-160656 A | 7/1987 |
| JP | 2002-42888 A | 2/2002 |
| JP | 2011-134623 A | 7/2011 |
| JP | 2012-234822 A | 11/2012 |
| JP | 2013-45659 A | 3/2013 |
| JP | 2016-127000 A | 7/2016 |
| WO | 2012/57031 A1 | 5/2012 |

OTHER PUBLICATIONS

English Translation of Chinese Search Report dated Sep. 15, 2021, issued in counterpart CN application No. 201880006381.0. (2 pages).

* cited by examiner

NONAQUEOUS ELECTROLYTE SECONDARY BATTERY POSITIVE ELECTRODE AND NONAQUEOUS ELECTROLYTE SECONDARY BATTERY

TECHNICAL FIELD

The present disclosure relates to a positive electrode for a non-aqueous electrolyte secondary battery, and a non-aqueous electrolyte secondary battery.

BACKGROUND ART

A positive electrode for a non-aqueous electrolyte secondary battery (hereinafter, simply referred to as "positive electrode") includes a positive electrode current collector and a positive electrode mixture layer formed on the current collector. In the non-aqueous electrolyte secondary battery, contamination of foreign matter and nail slicking and the like may cause the positive electrode current collector to be brought into contact with a negative electrode, resulting in a low-resistance internal short-circuit, which generates the flow of a large current and thereby generates a large amount of heat. Therefore, it has been proposed to form a protective layer on the surface of the positive electrode current collector to suppress the occurrence of the low-resistance internal short-circuit (for example, see Patent Literature 1).

CITATION LIST

Patent Literature

PATENT LITERATURE 1: Japanese Unexamined Patent Application Publication No. 2013-45659

SUMMARY

However, since the protective layer disclosed in Patent Literature 1 is a thin film layer made of only a binder resin, the effect of suppressing an internal short-circuit due to contamination of foreign matter is low. The protective layer is apt to be peeled off from the surface of the positive electrode current collector, which makes it difficult to sufficiently protect the surface of the positive electrode current collector.

In addition, in a non-aqueous electrolyte secondary battery, it is required to reduce the quantity of heat generation in the case where an internal short-circuit is caused between the area of the positive electrode mixture layer and the negative electrode by nail sticking and the like. It is however, difficult to reduce the quantity of heat generation by the technique of Patent Literature 1.

According to one aspect of the present disclosure, provided is a positive electrode for a non-aqueous electrolyte secondary battery, comprising: a positive electrode current collector mainly composed of aluminum; a positive electrode mixture layer containing a lithium-containing transition metal oxide and formed above the positive electrode current collector; and a protective layer interposed between the positive electrode current collector and the positive electrode mixture layer, wherein: the protective layer contains inorganic particles, a conductive agent, and a binder; and the peel strength between the positive electrode current collector and the protective layer is higher than the peel strength between the protective layer and the positive electrode mixture layer.

According to one aspect of the present disclosure, provided is a non-aqueous electrolyte secondary battery comprising: the positive electrode as described above; a negative electrode; a separator interposed between the positive electrode and the negative electrode; and a non-aqueous electrolyte.

The positive electrode for a non-aqueous electrolyte secondary battery according to one aspect of the present disclosure can highly suppress the occurrence of a low-resistance internal Short-circuit between the positive electrode current collector and the negative electrode without deteriorating the battery characteristics. The quantity of heat generation can also be suppressed in the case where an internal short-circuit is caused by, for example, nail sticking and the like.

DESCRIPTION OF EMBODIMENTS

Figure 1:
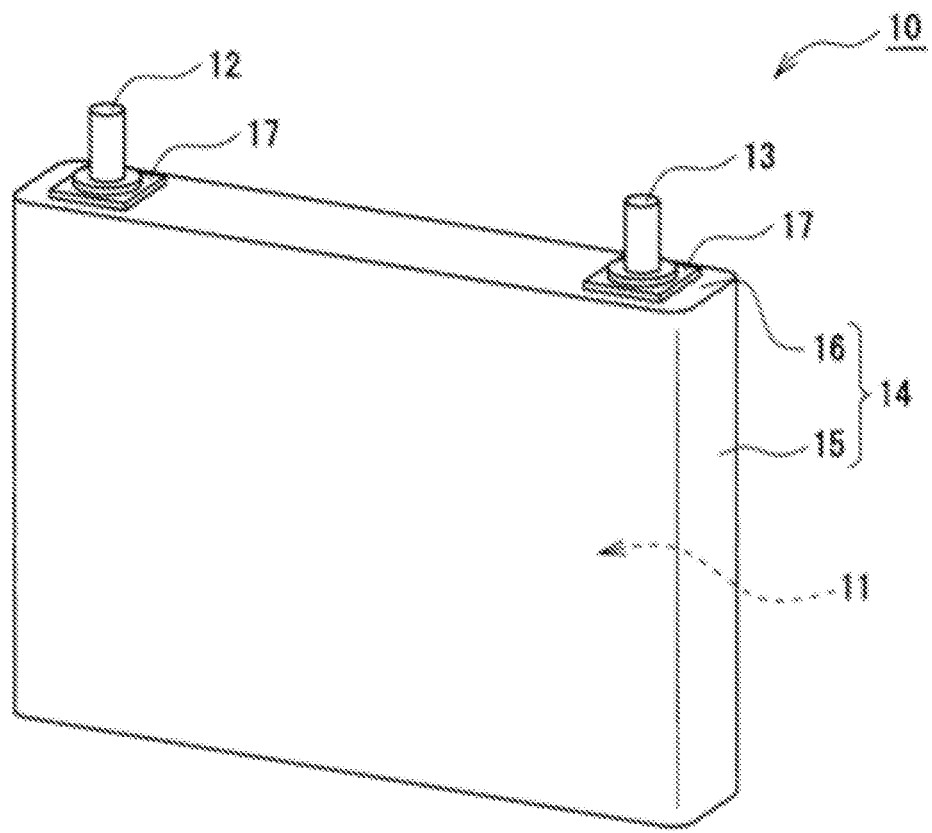
FIG. 1 is a perspective view of a non-aqueous electrolyte secondary battery as an example of an embodiment.

In a positive electrode as one aspect of the present disclosure, a protective layer containing inorganic particles, a conductive agent, and a binder is formed on a positive electrode current collector. Since the protective layer mainly composed of the inorganic particles is hard and is hardly broken, the protective layer can highly suppress the occurrence of a low-resistance internal short-circuit between the positive electrode current collector and a negative electrode even if contamination of large foreign matter of, for example, 200 µm or more occurs. The peel strength between the positive electrode current collector and the protective layer is set to be higher than the peel strength between a protective layer and a positive electrode mixture layer, whereby the peeling-off of the protective layer together with the positive electrode mixture layer is less likely to cause the surface of the current collector to be exposed. This point also enables the occurrence of a low-resistance internal short-circuit between the positive electrode current collector and the negative electrode to be highly suppressed.

The occurrence of an internal short-circuit between the area where the positive electrode mixture layer is formed and the negative electrode by nail sticking and the like may cause a risk of a redox reaction between a lithium-containing transition metal oxide as a positive electrode active material and an aluminum current collector mainly composed of aluminum (Al) to generate a large amount of heat. The protective layer isolates the aluminum current collector from the lithium-containing transition metal oxide to suppress the redox reaction in which the aluminum current collector participates. The protective layer thus further functions to reduce the quantity of heat generated by the occurrence of abnormality.

The protective layer having a thickness of 1 µm or more is preferably formed on the current collector in order to suppress the redox reaction. A mere increase in the thickness of the protective layer significantly decreases the current collecting properties to cause a deterioration in battery performance. The present inventors have succeeded in maintenance of good battery characteristics by securing the current collecting properties through addition of a conductive agent to the protective layer.

Hereinafter, an example of an embodiment of the positive electrode and a non-aqueous electrolyte secondary battery according to the present disclosure will be described in detail. The drawings referred to in description of die embodiment are schematic, and the dimension ratios of components and the like shown in the drawings may be different from those of the actual one. Specific dimensional ratios and the like should be judged from the following descriptions. The term "approximately" in the specification is intended to, in the example of "approximately the entire area", encompass "the entire area" and cases recognized as "substantially the entire area".

FIG. 1 is a perspective view illustrating a non-aqueous electrolyte secondary battery 10 as an example of au embodiment. The non-aqueous electrolyte secondary battery 10 includes an electrode assembly 11 and a non-aqueous electrolyte (not shown). The electrode assembly 11 includes positive electrodes 20, negative electrodes 30, and separators 40, each of the separators 40 interposed between one of the positive electrodes 20 and one of the negative electrodes 30 (see FIG. 3 described below). The electrode assembly 11 is a stacked electrode assembly including a plurality of the positive electrodes 20 and a plurality of the negative electrodes 30 alternately placed with the separators 40 therebetween. The positive electrodes of the present disclosure may be applied to a wound electrode assembly.

The non-aqueous electrolyte secondary battery 10 is, for example, a lithium ion battery. The electrode assembly 11 as a power generating element and the non-aqueous electrolyte are accommodated in a battery outer case 14. The battery outer case 14 generally includes au outer case body 15 having an approximately box shape and a sealing body 16 sealing the opening of the outer case body 15. The non-aqueous electrolyte secondary battery 10 is, for example, a square battery. The outer case body 15 and the sealing body 16 are preferably made of a metal material of winch the main component is aluminum. The battery outer case 14 can have a known structure. The term "main component" refers to a component with the highest content among the materials constituting the positive electrode active material.

On the sealing body 16, a positive electrode terminal 12 electrically connected to the positive electrodes 20 and a negative electrode terminal 13 electrically connected to the negative electrodes 30 are provided. The positive electrode terminal 12 is connected directly or via another conductive member to a positive electrode lead part 25 (see FIG. 3 described below) where the surface of the positive electrode current collector 21 is exposed. The negative electrode terminal 13 is connected directly or via another conductive member to a negative electrode lead part 35 (see FIG. 3 described below) where the surface of the negative electrode current collector 31 is exposed. Hereinafter, for convenience of description, the direction of arrangement of the positive electrode terminal 12 and the negative electrode terminal 13 is defined as a lateral direction, and the direction orthogonal to both the lateral direction and the stacking direction of the electrodes constituting the electrode assembly 11, is defined as a vertical direction.

A through-hole (not shown) is formed at each side of the sealing body 16 in the lateral direction. The positive electrode terminal 12 and the negative electrode terminal 13 or the conductive members connected to the terminals are inserted into the battery outer case 14 through the corresponding through-holes. The positive electrode terminal 12 and the negative electrode terminal 13 are fixed to the sealing body 16 with, for example, insulating members 17 provided in the through-holes. In general the sealing body 16 has a gas discharge mechanism (not shown).

Hereinafter, each component of the non-aqueous electrolyte secondary battery 10, in particular, the electrode assembly 11 (especially, positive electrode 20) will be described in detail with reference to FIGS. 2 to 4.

[Positive Electrode]

Figure 2:
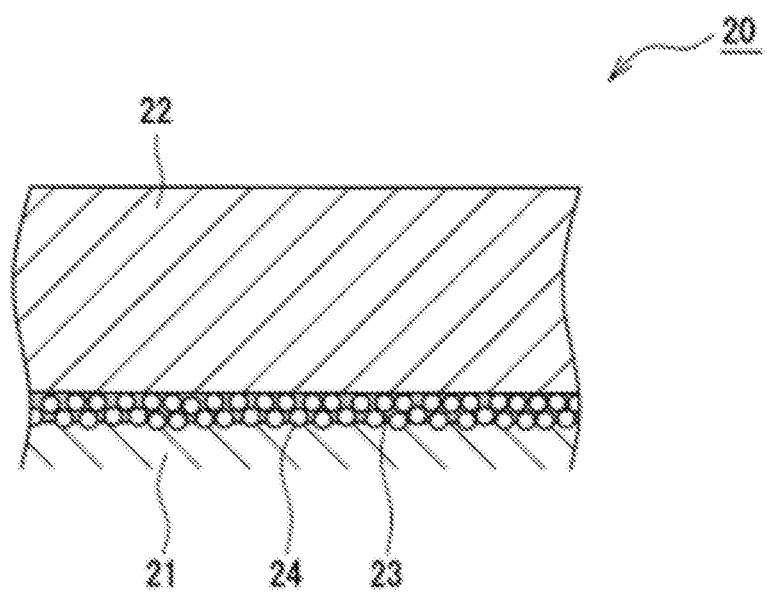
FIG. 2 is a cross-sectional view of a positive electrode as an example of an embodiment.

FIG. 2 is a cross-sectional view of a positive electrode 20 as an example of an embodiment. The positive electrode 20 includes a positive electrode current collector 21 mainly composed of aluminum (Al), a positive electrode mixture layer 22 containing a lithium-containing transition metal oxide and formed on the positive electrode current collector 21, and a protective layer 23 interposed between the positive electrode current collector 21 and the positive electrode mixture layer 22. The positive electrode mixture layer 22 contains the lithium-containing transition metal oxide as the positive electrode active material and suitably further, contains a conductive agent and a binder. The positive electrode mixture layer 22 is generally formed on each of both surfaces of the positive electrode current collector 21.

The positive electrode 20 can be produced by, for example, applying a positive electrode mixture slurry containing a positive electrode active material, a binder, and the like onto the protective layer 23 formed on the positive electrode current collector 21 to form a coating film; drying the coating film; and then performing rolling to form a positive electrode mixture layer 22 on each of both surfaces of the current collector. The positive electrode mixture slurry is not coated to the positive electrode current collector 21 in the region becoming a positive electrode lead part 25. As a result, the positive electrode mixture layer 22 is not formed in a part of the positive electrode 20 to form a positive electrode lead part 25 exposing the surface of the current collector.

The positive electrode 20 is constituted such that the peel strength between the positive electrode current collector 21 and the protective layer 23 is higher than the peel strength between the positive electrode mixture layer 22 and the protective layer 23. This prevents the exposure of the surface of the positive electrode current collector 21 caused by the peeling-off of the protective layer 23 together with the positive electrode mixture layer 22 when a large force is applied to the positive electrode 20 by contamination of foreign matter and the like. When a large force is applied to the surface of the positive electrode 20, only the positive electrode mixture layer 22 is peeled off, for example, and the protective layer 23 remains on the positive electrode current collector 21. Thus, in the positive electrode 20, the protective layer 23 is less likely to be detached, whereby the occurrence of the low-resistance internal short-circuit of the positive electrode current collector 21 and the negative electrode 30 can be highly suppressed. The peel strength is measured by a method described in Examples described below.

In the present embodiment, the binder applied to the positive electrode mixture layer 22 and the protective layer 23 achieves the peel strength between the positive electrode current collector 21 and the protective layer 23>the peel strength between the positive electrode mixture layer 22 and the protective layer 23. In order to enhance the peel strength between the positive electrode current collector 21 and the protective layer 23, fine unevenness may be formed in the surface of the positive electrode current collector 21, or the protective layer 23 may be compressed to cause the protective layer 23 to ingrow into the positive electrode current collector 21 before the positive electrode mixture slurry is applied.

The positive electrode current collector 21 to be used is made of, for example, aluminum or an aluminum alloy. The content of aluminum in the positive electrode current collector 21 is 50% or more, preferably 70% or more, and more preferably 80% or more based on the weight of the current collector. The positive electrode current collector 21 is, for example, a metal foil made of aluminum or an aluminum alloy, and has a thickness of about 10 to 100 μm.

Examples of the positive electrode active material include lithium transition metal oxides containing transition metal elements such as cobalt (Co), manganese (Mn), and nickel (Ni). Examples of the lithium transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M: at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These metal oxides may be used alone or as a mixture of two or more thereof.

The conductive agent contained in the positive electrode mixture layer 22 is used in order to enhance the electrical conductivity of the mixture layer. Examples of the conductive agent include carbon materials such as carbon black (CB), acetylene black (AB), Ketjen black, and graphite. These conductive agents may be used alone or in combination of two or more thereof.

The binder contained in die positive electrode mixture layer 22 is used in order to maintain a good contact stale between the positive electrode active material and the conductive agent and enhance the binding properties of the positive electrode active material and the like to the surface of the current collector. The binder of the positive electrode mixture layer 22 is non-aqueous binder dissolved or dispersed in an organic solvent. Preferably, the binder is generally used as the binder of the positive electrode for a non-aqueous electrolyte secondary battery, and does not swell in an organic solvent, for example. Examples of the binder include fluororesins such as polyvinylidene fluoride (PVdF).

The protective layer 23 contains inorganic particles 24, a conductive agent, and a binder and is mainly composed of the inorganic particles 24. The amount of the inorganic particles 24 to be contained is at least 70% by weight or more, preferably 70 to 99.8% by weight, and more preferably 90 to 99% by weight based on the weight of the protective layer 23. The conductive agent improves the electrical conductivity of the protective layer 23. The binder binds the inorganic particles 24 to the conductive agent and binds the inorganic particles 24 and the like to the surface of the current collector. The protective layer 23 is formed on the positive electrode current collector 21, and the positive electrode mixture layer 22 is formed on the protective layer 23. As described above, since the positive electrode mixture layer 22 is formed on each of both surfaces of the positive electrode current collector 21, the protective layer 23 is suitably formed on each of both surfaces of the positive electrode current collector 21.

The protective layer 23 is preferably formed in approximately the entire area where the positive electrode mixture layer 22 is formed, on the positive electrode current collector 21. The protective layer 23 preferably has a first region 23A formed in a range overlapping with the positive electrode mixture layer 22 in the thickness direction of the positive electrode 20 on the positive electrode current collector 21, and a second region 23B (see FIGS. 3 and 4) formed so as to protrude from the edge of the positive electrode mixture layer 22. The first region 23A and the second region 23B are successively formed without being broken. The protective layer 23 can be formed by applying a slurry prepared by mixing inorganic particles 24, a conductive agent, a binder, and a dispersion medium to each of both the surfaces of the positive electrode current collector 21 to form a coating film, and drying the coating film.

The first region 23A isolates the positive electrode current collector 21 mainly composed of aluminum from the lithium transition metal oxide to suppress the redox reaction involving the positive electrode current collector 21. The first region 23A reduces the quantity of heat generation due to an internal short-circuit caused by nail sticking and the like, to improve the safety against nail sticking of the battery. Meanwhile, the second region 23B highly suppresses the occurrence of a low-resistance internal short-circuit between the part of the positive electrode current collector 21 where the positive electrode mixture layer 22 is not formed and the negative electrode 30. The second region 23B is a hard layer mainly composed of inorganic particles 24 and is therefore hardly broken even if large foreign matter of 200 μm or more is strongly abutted against the second region 23B.

The protective layer 23 preferably has a thickness of 1 to 20 μm and more preferably 1 to 10 μm. Since the protective layer 23 contains a conductive agent even if the protective layer 23 has a large thickness, the electrical conductivities of the positive electrode current collector 21 and the positive electrode mixture layer 22 are not deteriorated, and good battery characteristics can be maintained. However, since a too large thickness of the protective layer 23 may reduce the battery capacity, the thickness of the protective layer 23 is preferably set to 20 μm or less. The surface density of the protective layer 23, i.e., the weight per unit area of the protective layer 23 on the positive electrode current collector 21, is preferably 0.1 to 50 $g/m^2$, and more preferably 1 to 20 $g/m^2$.

In the protective layer 23, the first region 23A and the second region 23B may differ in thickness. The thickness of the first region 23A is smaller than that of the second region 23B, and in the first region 23A, the inorganic particles 24 sink in the positive electrode current collector 21. Such a difference in thickness is formed, for example, in the step of rolling the positive electrode 20 by not abutting the roller for rolling against the region where the positive electrode mixture layer 22 is not formed and not applying a pressure to the region. A reduction in the thickness of the first region 23A prevents deterioration of the electrical conductivities of the positive electrode current collector 21 and the positive electrode mixture layer 22, which is preferable. The sinking of the inorganic panicles 24 into the positive electrode current collector 21 enhances the binding properties between the first region 23A and the positive electrode current collector 21, which is preferable. The second region 233 having a larger thickness has a higher effect of suppressing the internal short-circuit by examination of foreign matter, which is preferable.

The inorganic particles 24 contained in the protective layer 23 are preferably mainly composed of an inorganic compound having a specific resistance of $10^3$ Ω·m or more. The use of the inorganic compound having a specific resistance of $10^3$ Ω·m or more suppresses the occurrence of a low-resistance internal short-circuit generating the flow of a large current.

Suitably, specific examples of the inorganic particles 24 include at least one selected from aluminum oxide, titanium oxide, manganese oxide, and silicon oxide. In particular, aluminum oxide ($Al_2O_3$) or titanium oxide ($TiO_2$) is preferably used, lire inorganic particles 24 have an average panicle diameter of, for example, 1 μm or less and preferably 0.3 to 1 μm. The term "average particle diameter" herein refers to a volume average particle diameter measured by a light scattering method.

The conductive agent contained in the protective layer 23 can be the same type as that of the conductive agent applied to the positive electrode mixture layer 22. For example, carbon materials such as carbon black (CB), acetylene black (AB), Ketjen black, and graphite, can be used. These conductive agents may lie used alone or in combination of two or more thereof. The content of the conductive agent is preferably 0.1 to 20 wt %, and particularly preferably 1 to 10 wt %, based on the weight of the protective layer 23. The content rate of the conductive agent in the protective layer 23 is higher than that of the conductive agent in, for example, the positive electrode mixture layer 22.

The binder contained in the protective layer 23 is preferably an aqueous binder dissolved or dispersed in water. When a non-aqueous binder is applied to the binder of the protective layer 23, the protective layer 23 has high affinity with the positive electrode mixture layer 22 containing a non-aqueous binder to improve the peel strength between the positive electrode mixture layer 22 and the protective layer 23, but affinity between both the layers can be reduced by applying the aqueous binder to the binder of the protective layer 23. This makes it possible to set the peel strength between the positive electrode current collector 21 and the protective layer 23 to be relatively higher than the peel strength between the protective layer 23 and the positive electrode mixture layer 22.

Examples of the binder applied to the protective layer 23 include those obtained by subjecting polyacrylic acid (PAA), a PAA salt, a polycarboxylic acid salt, carboxymethyl cellulose (CMC), a CMC salt, polyethylene oxide (PEO), polyvinyl alcohol (PVA), polyletrafluoroethylene (PTFE), polyacrylonitrile (PAN), or styrene-butadiene rubber (SBR) and the like to a water dispersion treatment. These may be used alone or in combination of two or more thereof.

Figure 3:
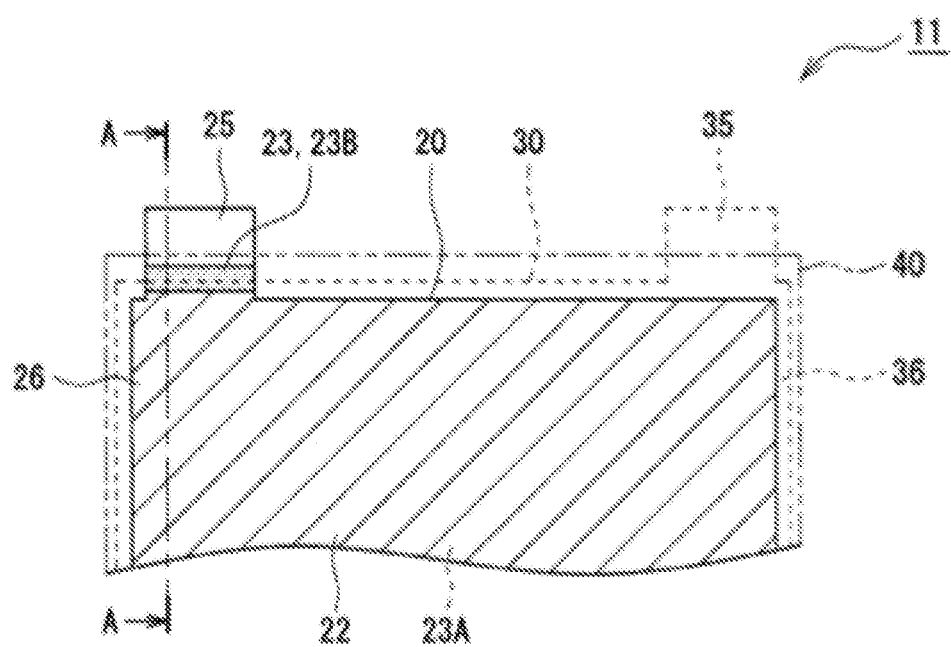
FIG. 3 is a diagram illustrating the layered structure of an electrode assembly as an example of an embodiment.
Figure 4:
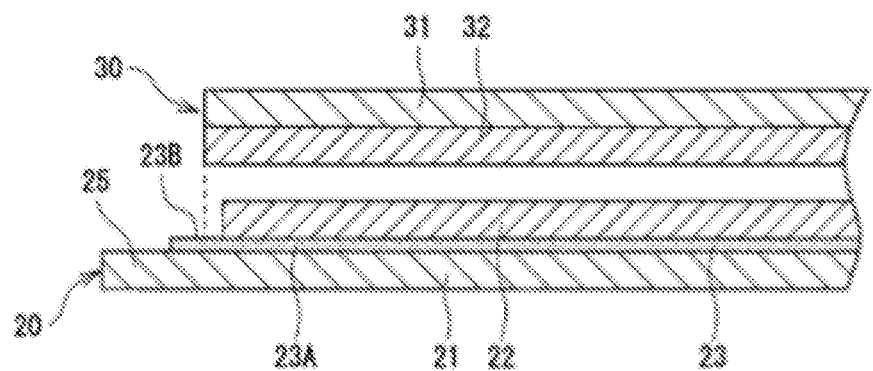
FIG. 4 is a cross-sectional view taken along line A-A in FIG. 3.

FIGS. 3 and 4 are diagrams illustrating the layered structure of the electrode assembly 11. In FIG. 3, the negative electrode 30 is shown by the broken line, and the separator 40 is shown by the two-dot line. In FIG. 4, the separator 40 is not shown. The electrode assembly 11 has a layered structure including the positive electrodes 20 and the negative electrodes 30 alternately stacked with the separators 40 therebetween. As described above, in order to secure smooth movement of lithium ions between the positive and negative electrodes, the positive electrode 20 is smaller than the negative electrode 30, and the positive electrode 20 and the negative electrode 30 are arranged such that at least the positive electrode mixture layer 22 faces the negative electrode mixture layer 32.

The positive electrode 20 includes a positive electrode lead part 25 formed of a protruding part of the positive electrode current collector 21. The positive electrode 20 includes a body part 26 having, for example, a nearly rectangular shape in front view and the positive electrode lead part 25 protruding from one end of the body part 26 in the vertical direction and having a nearly rectangular shape in planar view. The positive electrode mixture layer 22 is formed in approximately the entire area of the body part 26 on each of both surfaces of the body part 26 and also in a narrow area of the base of the positive electrode lead part 25. In other words, the positive electrode mixture layer 22 is not formed in the large part of the positive electrode lead part 25.

The positive electrode lead parts 25 are stacked at the portion where the surface of each of the current collectors is exposed, and are connected to the positive electrode terminal 12.

The negative electrode 50 includes a negative electrode lead part 35 formed of a protruding part of the negative electrode current collector 31. The negative electrode 30 includes a body part 36 having, for example, a nearly rectangular shape in front view and the negative electrode lead part 35 protruding from one end of the body part 36 in the vertical direction and having a nearly rectangular shape in planar view. The negative electrode lead parts 35 are stacked at the portion where the surface of each of the current collectors is exposed, and are connected to the negative electrode terminal 13. In the present embodiment, the positive electrode lead parts 25 are arranged at one end side of the electrode assembly 11 in the lateral direction, and the negative electrode lead parts 35 are arranged at the other end side of the electrode assembly 11 in the lateral direction. The positive electrode lead part 25 extends out of the area facing the negative electrode 30 in the vertical direction.

Preferably, the protective layer 23 is formed in approximately the entire area of the body part 26 on each of both surfaces of the body part 26 and is also formed in the area in the positive electrode lead part 25 where the positive electrode mixture layer 22 is not formed so as to protrude from the edge of the positive electrode mixture layer 22. The second region 23B, which is the portion of the protective layer 23 protruding out of the edge of the positive electrode mixture layer 22, may be formed only in the area facing the negative electrode 30 or may be preferably formed in an area beyond the area facing the negative electrode 30 considering positional displacement of the positive and negative electrodes.

In the example shown in FIG. 3, the protective layer 23 (second region 23B) is formed in the area of about one-third of the length from the base of the positive electrode lead part 25 in the vertical direction. The surface of the current collector is exposed in the area of about two-thirds from the front end of the positive electrode lead part 25. The protective layer 23 may have any positional relationship with the separator 40, as long as being formed beyond the area feeing the negative electrode 30. The thick protective layer 23 is formed in the area where the positive electrode lead part 25 concentrating the current on the plate faces the negative electrode 30, and thereby the safety in contamination of foreign matter can be enhanced.

[Negative Electrode]

The negative electrode 30 includes, as described above, a negative electrode current collector 31 of a metal foil and the like and a negative electrode mixture layer 32 formed on the current collector. The negative electrode current collector 31 to be used can be, for example, a foil of a metal that is stable hi the potential range of the negative electrode 30 such as copper, or a film having a surface layer of such a metal. The negative electrode mixture layer 32 suitably contains a binder, in addition to the negative electrode active material. The negative electrode mixture layer 32 is generally formed on each of both surfaces of the negative electrode current collector 31.

The negative electrode 30 can be produced by, for example, applying a negative electrode mixture slurry containing a negative electrode active material, a binder, and the like onto a negative electrode current collector 31 to form a coating film, drying the coating film, and then performing rolling to form a negative electrode mixture layer 32 on each surface of the current collector. The negative electrode mixture slurry is not coated to the negative electrode current collector 31 in the region becoming a negative electrode lead part 35. As a result, the negative electrode mixture layer 32 is not formed in a part of the negative electrode 30 to form a negative electrode lead part 35 excising the surface of the current collector.

The negative electrode active material is not particularly limited as long as the negative electrode active material is any material that can reversibly occlude and discharge lithium ions. Examples of die negative electrode active material capable of being used include carbon materials such as natural graphite and artificial graphite; metals alloying with lithium such as silicon (Si) and tin (Sn); and alloys or complex oxides containing metal elements such as Si and Sn. The negative electrode active materials may be used alone or in combination of two or more thereof.

Examples of the binder contained in the negative electrode mixture layer 32 include, as in the positive electrode, fluororesins, PAN, polyimide resins, acrylic resins, and polyolefin resins. In the case of using an aqueous solvent for preparing the negative electrode mixture slurry, SBR, CMC or its salt, PAA or its salt, and PVA and the like may be used.

[Separator]

The separator 40 to be used is a porous sheet having ionic permeability and insulation properties. Specific examples of the porous sheet include micro-porous thin films, woven fabric, and non-woven fabric. The materials of the separator are suitably olefin resins such as polyethylene and polypropylene, and cellulose. The separator may be a laminate including a cellulose fiber layer and a thermoplastic resin fiber layer made of an olefin resin and the like. The separator to be used may be a multilayer separator including a polyethylene layer and a polypropylene layer or may have a surface onto which au aramid resin is applied.

A filler layer containing an inorganic filler may be formed in the interface between the separator 40 and at least one of the positive electrode 20 and the negative electrode 30. Examples of the inorganic filler include oxides containing at least one of titanium (Ti), aluminum (Al), silicon (Si), and magnesium (Mg); and phosphate compounds. The filler layer can be formed by, for example, applying a slurry containing the filler onto the surface of the positive electrode 20, the negative electrode 30, or the separator 40.

[Non-Aqueous Electrolyte]

The non-aqueous electrolyte contains a non-aqueous solvent and an electrolyte salt dissolved in die non-aqueous solvent. The non-aqueous electrolyte is not limited to liquid electrolytes (non-aqueous electrolytic solutions) and may be a solid electrolyte such as a gelled polymer. Examples of the non-aqueous solvent capable of being used include esters; ethers; nitriles such as acetonitrile; amides such as dimethylformamide; and solvent mixtures of two or more thereof. The non-aqueous solvent may contain a halogen substitution product formed from such a solvent by substituting halogen atoms such as fluorine for at least a part of its hydrogen atoms.

Examples of the esters include cyclic carbonates such as ethylene carbonate (EC), propylene carbonate (PC), and butylene carbonate; chain carbonates such as dimethyl carbonate (DMC), ethyl methyl carbonate (EMC), diethyl carbonate (DEC), methyl propyl Carbonate, ethyl propyl carbonate, and methyl isopropyl carbonate; cyclic carboxylates such as γ-butyrolactone and γ-valerolactone, and chain carboxylates such as methyl acetate, ethyl acetate, propyl acetate, methyl propionate (MP), ethyl propionate, and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ether; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Preferred examples of the halogen substitution product to be used include fluorinated cyclic carbonates such as fluoroethylene carbonate (FEC); fluorinated chain carbonates; and fluorinated chain carboxylates such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (1<x<6, n=1 or 2), borates such as $LiB_{10}Cl_{10}$, LiCl, Libr, LiI LiBCl, $Li_2B_4O_7$, and $Li(B(C_2O_4)F_2)$, and imides such as $LiN(SO_2CF_3)_2$ and $LiN(C_lF_{2l+1}SO_2)(C_mF_{2m+1}SO_2)$ (where, l and m each represent an integer of 1 or more). The lithium salts may be used alone or as a mixture of two or more thereof. Among these lithium salts, $LiPF_6$ is preferably used from the viewpoint of ionic conductivity, electrochemical stability, and the like. The concentration of the lithium salt is preferably 0.8 to 1.8 mol for 1 L of the non-aqueous solvent.

EXAMPLES

Hereinafter, the present disclosure will be described in more detail by Examples, but the present disclosure is not limited to the following Examples.

Example 1

[Production of Positive Electrode]

91 parts by weight of aluminum oxide ($Al_2O_3$), 5 parts by weight of acetylene black (AB), 2.5 parts by weight of styrene-butadiene rubber (SBR), 0.5 parts by weight of carboxyrnethyl cellulose (CMC), and 1 part by weight of a polycarboxylic acid ammonium salt were mixed. An appropriate amount of water was further added to the mixture to prepare a slurry for protective layer. The slurry was then applied onto both surfaces of a long positive electrode current collector of an aluminum foil having a thickness of 15 μm to form a coating film, and the coaling film was dried to form a protective layer.

97 parts by weight of a lithium-containing transition metal oxide represented by $LiNi_{0.5}Co_{0.2}Mn_{0.3}O_2$ as a positive electrode active material, 2 parts by weight of acetylene black (AB), and 1 part by weight of polyvinylidene fluoride (PVdF) were mixed. An appropriate amount of N-methyl-2-pyrrolidone (NMP) was further added to the mixture to prepare a positive electrode mixture slurry. The positive electrode mixture slurry was then applied to the surfaces of the protective layers (first region 23A) formed on the positive electrode current collector to form a coating film, and the coating film was dried. The coaling film was rolled with a roller, and then cut into a predetermined electrode size to produce positive electrodes each including a protective layer and a positive electrode mixture layer formed in this order on each of the surfaces of tire positive electrode current collector.

In the cutting step, the positive electrode was disposed so as to include a body part having a nearly rectangular shape in planar view and a positive electrode lead part protruding from die edge of the body part. The protective layer and the positive electrode mixture layer were formed in approximately the entire area of the body part. In the positive electrode lead part, the protective layer (second region 23B) was formed in the area of about one-third of the length from the base of the positive electrode lead part in the vertical direction. The surface of the positive electrode current collector was exposed in the area of about two-thirds from the front end of the positive electrode lead part. The positive electrode mixture layer was formed in a small area of the base of the positive electrode lead pair and its vicinity. The positive electrode had the same shape as that shown in FIG. 3.

[Production of Negative Electrode]

98.7 parts by weight of a graphite powder, 0.7 parts by weight of carboxymethyl cellulose (CMC), and 0.6 parts by weight of styrene-butadiene rubber (SBR) were mixed. An appropriate amount of water was further added to the mixture to prepare a negative electrode mixture slurry. The negative electrode mixture slurry was then applied onto both surfaces of a long negative electrode current collector of a copper foil to form a coating film, and the coating film was dried. The coating film was rolled with a roller, and then cut into a predetermined electrode size to produce negative electrodes each including a negative electrode mixture layer formed on each of the surfaces of the positive electrode current collector. The negative electrode included a body part and a negative electrode lead part as in the positive electrode.

[Preparation of Non-aqueous Electrolyte]

Ethylene carbonate (EC), ethyl methyl carbonate (EMC), and dimethyl carbonate (DMC) were mixed at a volume ratio of 3:3:4. $LiPF_6$ was dissolved in this solvent mixture at a concentration of 1.2 mol/L to prepare a non-aqueous electrolyte.

[Production of Battery]

The positive electrodes and the negative electrodes were alternately placed with a polyethylene separator therebetween to produce a slacked electrode assembly. The numbers of the stacked positive and negative electrodes were each 16. The positive electrode lead parts of the positive electrodes were arranged at one end side of the electrode assembly in the lateral direction, and the negative electrode lead parts of the negative electrodes were arranged at the other end side of the electrode assembly in the lateral direction. Then, the positive electrodes and the negative electrodes were stacked such that the second region of the protective layer formed so as to protrude from the edge of the positive electrode mixture layer extended out of the area of the positive electrode lead part where the negative electrode faces. The electrode assembly was accommodated in an outer case body having approximately a box shape, and the non-aqueous electrolyte solution was then poured in the outer case body. The lead parts were connected to the positive electrode terminal and the negative electrode terminal, respectively, of the sealing body, and the opening of the outer case body was sealed by the sealing body to produce a square battery including a stacked electrode assembly.

Example 2

A battery was produced in the same manner as in Example 1 except that, in order to form a protective layer, a slurry for protective layer was applied such that the protective layer had a thickness of 1 μm.

Example 3

A battery was produced in the same manner as in Example 1 except that, in order to form a protective layer, 70 parts by weight of aluminum oxide ($Al_2O_3$), 20 parts by weight of acetylene black (AB), 8 parts by weight of styrene-butadiene rubber (SBR), 1 part by weight of carboxymethyl cellulose (CMC), 1 part by weight of a polycarboxylic acid ammonium salt, and an appropriate amount of water were mixed to prepare a slurry for protective layer.

Example 4

A battery was produced in the same manner as in Example 1 except that, in order to form a protective layer, titanium oxide ($TiO_2$) was used instead of $Al_2O_3$.

Comparative Example 1

A battery was produced in the same manner as in Example 1 except that, in order to form a protective layer. $Al_2O_3$ was not used.

Comparative Example 2

A battery was produced in the same manner as in Example 1 except that, in order to form a protective layer, the additive amount of $Al_2O_3$ was reduced to set the amount of $Al_2O_3$ to 50% by weight based on the weight of the protective layer.

Comparative Example 3

A battery was produced in the same manner as in Example 1 except that, in order to form a protective layer, 70 parts by weight of aluminum oxide ($Al_2O_3$), 20 parts by weight of acetylene black (AB), 10 parts by weight of PVdF, and an appropriate amount of N-methyl-2-pyrrolidone (NMP) were mixed to prepare a slurry for protective layer.

[Peel Test]

The positive electrodes produced above were each tested by the following procedure. In the evaluation results, a case where the exposure of the current collector was not observed was taken as good; a case of less than 10% exposure of the current collector was taken as average; and a case where 10% or more exposure of the current collector was observed was taken as poor.

(1) A test piece in winch the positive electrode was cut into a predetermined size was fixed to a base with an adhesive, and a pressure sensitive adhesive tape was stuck on the surface of the positive electrode mixture layer.

(2) The pressure sensitive adhesive tape was peeled off at a predetermined speed, and the protective layer remaining on the positive electrode current collector was observed.

[Foreign Matter Short-Circuit Test]

The batteries produced above were each tested by the following procedure:

(1) Each of the batteries was charged with a constant current of 0.3 C (600 mA) to a battery voltage of 4.2 V under an environment of a temperature of 25° C. and was continuously charged at a constant voltage of 4.2 V until the current value reached 0.05 C (90 mA);

(2) The outer case of the battery charged in the step (1) was disassembled to take out the electrode assembly. A nickel piece (L-shape, each side having a length of 1 mm, a height of 0.2 mm, and a width of 0.1 mm) was then inserted into the positive electrode lead part at a portion (second region 23B) of the protective layer facing the negative electrode, and a pressure was applied to the portion where the nickel piece was inserted; and (3) It was examined whether the pressure application caused ignition or not.

[Nail Sticking Test]

Each of the batteries was tested by the following procedure:

(1) Each of the batteries was charged with a constant current of 0.3 C (600 mA) to a battery voltage of 4.2 V under an environment of a temperature of 25° C. and was continuously charged at a constant voltage of 4.2 V until the current value reached 0.05 C (90 mA);

(2) The tip of a wire nail having a diameter of 3 mm was brought into contact with the central portion of the side face of the battery charged in the step (1) under an environment of a temperature of 25° C. The wire nail was stuck into the battery at a rate of 10 mm/sec along the thickness direction, and the sticking of the wire nail was stopped at the time the wire nail completely pierced the battery, and (3) The battery temperature was measured at a position 10 mm apart from the central portion of the side face of the batten at which the wire nail was stuck to determine the highest temperature of the battery.

In all of the positive electrodes used in the batteries of Examples, only the positive electrode mixture layer was peeled off in the peel test, and the protective layer remained on the surface of the positive electrode current collector. Meanwhile, the peeling-off of the protective layer was observed in the positive electrode used in the battery of Comparative Example 3. As shown in Table 1, this difference had a large influence on the evaluation results of the nail sticking test.

REFERENCE SIGNS LIST

10: non-aqueous electrolyte secondary battery
11: electrode assembly
12: positive electrode terminal
13: negative electrode terminal
14: battery outer case
15: outer case body
16: sealing body
17: insulating member
20: positive electrode
21: positive electrode current collector
22: positive electrode mixture layer
23: protective layer
23A: first region
23B: second region
24: inorganic particles
25: positive electrode lead part
30: negative electrode
31: negative electrode current collector
32: negative electrode mixture layer

TABLE 1

|  | Constituent material of protective layer | Inorganic particles | Thickness of protective layer | Peel test | Foreign matter short-circuit test | Highest temperature |
|---|---|---|---|---|---|---|
| Example 1 | Al$_2$O$_3$ particles + conductive agent + aqueous binder | 91 wt % | 3 μm | Good | No ignition | 510° C. |
| Example 2 | Al$_2$O$_3$ particles + conductive agent + aqueous binder | 91 wt % | 1 μm | Good | No ignition | 556° C. |
| Example 3 | Al$_2$O$_3$ particles + conductive agent + aqueous binder | 70 wt % | 3 μm | Good | No ignition | 588° C. |
| Example 4 | TiO$_2$ particles + conductive agent + aqueous binder | 91 wt % | 3 μm | Good | No ignition | 545° C. |
| Comparative Example 1 | Conductive agent + aqueous binder | — | 1 μm | Good | ignition | 683° C. |
| Comparative Example 2 | Al$_2$O$_3$ particles + conductive agent + aqueous binder | 50 wt % | 3 μm | Average | ignition | 665° C. |
| Comparative Example 3 | Al$_2$O$_3$ particles + conductive agent + non-aqueous binder | 70 wt % | 3 μm | Poor | No ignition | 672° C. |

As shown in Table 1, any of the batteries of Examples did not ignite in the foreign matter short-circuit test and exhibited the highest temperatures much lower than those of the batteries in Comparative Examples in the nail sticking test. Ignition was observed in the batteries of Comparative Examples 1 and 2 in the foreign matter short-circuit test. The batteries of Examples can highly suppress the occurrence of a low-resistance internal short-circuit by contamination of foreign matter between the positive electrode current collector and the negative electrode and also can sufficiently suppress the quantity of heat generation in the case where an internal short-circuit is caused by nail sticking.

35: negative electrode lead pan
40: separator

The invention claimed is:

1. A positive electrode for a non-aqueous electrolyte secondary battery, comprising:
   a positive electrode current collector mainly composed of aluminum;
   a positive electrode mixture layer containing a lithium-containing transition metal oxide and formed above the positive electrode current collector; and
   a protective layer interposed between the positive electrode current collector and the positive electrode mixture layer, wherein:
the protective layer contains inorganic particles, a conductive agent, and a binder, 70% by weight or more of the inorganic particles being contained based on a weight of the protective layer;
a peel strength between the positive electrode current collector and the protective layer is higher than a peel strength between the protective layer and the positive electrode mixture layer; and
the protective layer has, on the positive electrode current collector, a first region formed in approximately an entire area where the positive electrode mixture layer is formed, and a second region formed so as to protrude from an edge of the positive electrode mixture layer.

2. The positive electrode for a non-aqueous electrolyte secondary battery according to claim 1, wherein the protective layer contains at least one selected from polyacrylic acid, a polyacrylic acid salt, and a polycarboxylic acid salt.

3. The positive electrode for a non-aqueous electrolyte secondary battery according to claim 1, wherein the inorganic particles are mainly composed of an inorganic compound having a specific resistance of $10^3$ Ω·m or more.

4. The positive electrode for a non-aqueous electrolyte secondary battery according to claim 1, wherein the protective layer has a thickness of 1 to 20 μm.

5. The positive electrode for a non-aqueous electrolyte secondary battery according to claim 1, wherein the inorganic particles are at least one selected from aluminum oxide, titanium oxide, manganese oxide, and silicon oxide.

6. A non-aqueous electrolyte secondary battery comprising:
a positive electrode according to claim 1;
a negative electrode;
a separator interposed between the positive electrode and the negative electrode; and
a non-aqueous electrolyte.

7. The non-aqueous electrolyte secondary battery according to claim 6, comprising a stacked electrode assembly comprising a plurality of the positive electrodes, a plurality of the negative electrodes, and a plurality of the separators, the positive electrodes and the negative electrodes being alternately placed with the separators therebetween,
wherein the protective layers are provided so as to face the negative electrodes through the separators.

8. The positive electrode for a non-aqueous electrolyte secondary battery according to claim 1, wherein the binder contains styrene-butadiene rubber and carboxymethyl cellulose.

9. The positive electrode for a non-aqueous electrolyte secondary battery according to claim 1,
wherein the positive electrode mixture layer contains a non-aqueous binder dissolved or dispersed in an organic solvent and the protective layer contains an aqueous binder dissolved or dispersed in water.

* * * * *